Figure 1:
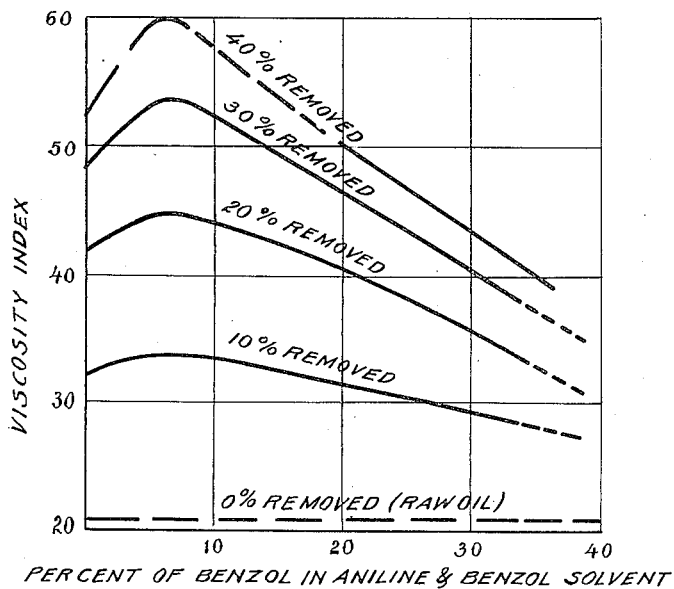
Figure 2:
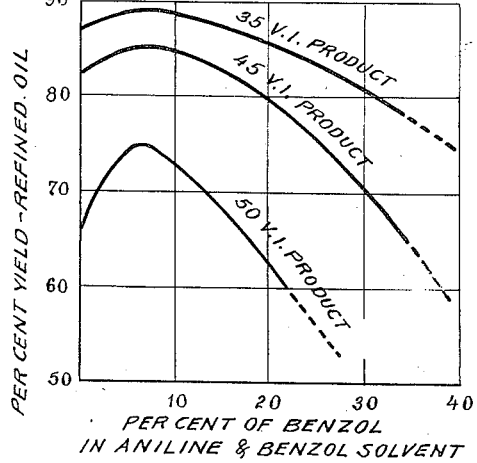
Figure 3:
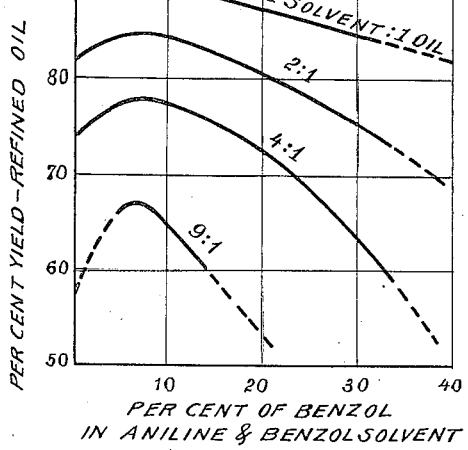

Feb. 8, 1938.  B. W. STORY ET AL  2,107,429

PROCESS OF REFINING PETROLEUM

Filed Nov. 24, 1934

EFFECT ON VISCOSITY INDEX
AT CONSTANT YIELDS
(BATCH EXTRACTION)

EFFECT ON YIELD
AT CONSTANT VISCOSITY INDEX
(BATCH EXTRACTION)

EFFECT ON YIELD
AT CONSTANT SOLVENT/OIL RATIO
(BATCH EXTRACTION)

INVENTORS
Bertrand W. Story
Vladimir A. Kalichevsky
BY
ATTORNEY

Patented Feb. 8, 1938

2,107,429

UNITED STATES PATENT OFFICE 2,107,429

PROCESS OF REFINING PETROLEUM

Bertrand W. Story and Vladimir A. Kalichevsky, Woodbury, N. J., assignors to Socony-Vacuum Oil Company, Incorporated, New York, N. Y., a corporation of New York Application November 24, 1934, Serial No. 754,554

6 Claims. (Cl. 196—13)

This invention has to do with processes for the chemical refining of lubricant oils by the action of reagents of the general class termed selective solvents.

The general aim of these selective solvent refining methods is to improve the quality of the oil by increasing the viscosity index, and by reducing the carbon residue, other properties, such as color, etc., being concurrently improved. Viscosity index is an arbitrarily determined number which indicates the rate of loss of viscosity of the oil with increasing temperature. A high viscosity index indicates a relative resistance to such loss of viscosity. In the present terminology of the art, the rapidly thinning constituents are spoken of as naphthenic, and the more slowly thinning constituents are spoken of as paraffinic. In this sense only, and not in a rigorous chemical sense, the terms naphthenic and paraffinic are used in the following short discussion of solvent treating methods. Three methods of general attack upon an oil for the purpose of raising its viscosity index are open. In the first method, the oil may be contacted with a reagent capable of dissolving the naphthenic constituents, but relatively immiscible with the paraffinic constituents, followed by separation of the combined reagent and extract, leaving an improved oil. In the second general method, the procedure is parallel, but the function and relative properties of the reagent are reversed, and the improved oil is removed with the reagent as an extract, to be later separated therefrom, while the discarded portion is that which was immiscible with the reagent. The third general method of procedure is one in which two reagents, one of each of the above kinds, are applied, one serving to gather into itself the naphthenic constituents, and the other gathering the paraffinic constituents.

The degree of improvement attained by these processes above outlined, as expressed in the properties of greatest importance in the refined oil, is shown by the increase in viscosity index.

Viscosity index is a numerical index, referred to an arbitrary scale, as proposed by Dean and Davis, Chemical and Metallurgical Eng. 36,—618 (1929), and refers to the rate at which the viscosity of the oil decreases with increase in temperature. Pennsylvania base lubricants of present manufacture have a viscosity index of around 100, coastal naphthenic base lubricants have indices of 0 to 20, and various Mid-Continent mixed base lubricants range in between these values. The index may be numerically less than 0, or more than 100. The high index numbers indicate a greater resistance to loss of viscosity with rise of temperature. Rise in viscosity index is indicative of the effectiveness of the refining.

This invention relates broadly to the method of treating above outlined and has specifically to do with a new and novel solvent for use therein, and with the method of refining by the use of such solvent.

It has been proposed to apply aniline as a solvent for use in refining methods of the class first outlined above. Aniline alone is not particularly efficient as a reagent for use in such processes since it is not possessed of a particularly high selectivity. It has been discovered by us, however, that admixture of a certain amount of benzol with aniline to form a solvent refining reagent leads to new and unexpected increases in the selectivity of the reagent.

An object of this invention is to increase the efficiency of aniline as a reagent for the solvent refining of petroleum lubricants, and the development of a refining method for making use of such improved reagent.

The unusual effect of the addition of controlled amounts of benzol to aniline reagent in accordance with our invention when used in solvent refining may best be seen by examination of the charts attached to and made a part of this specification. These charts express, in various ways, the comparative effects of treating an oil with an aniline reagent containing various percentages of benzol by volume.

The raw stock exhibited the following characteristics:

Gravity—° A. P. I. _____ 20.8
Viscosity S. U. V. @ 210° F_____ 67"
Viscosity index_____ 21

The method of treatment was by batch extraction, and the charts indicate results obtained by various batch extractions at a constant temperature in the neighborhood of 80° F.

In Figure I we have set forth the effect on the viscosity index of the refined oil after the removal of varying percentages of extract with a reagent carrying varying percentages of benzol. Considering the curve labelled "30% removed" we find that when we removed 30 per cent of the oil, leaving a yield of 70 per cent, with a reagent consisting solely of aniline, (0 per cent benzol), the viscosity index of the product is about 48.5. If the same per cent of the oil is removed or in other words if the same yield is made with a reagent containing about 6 per cent benzol and 94 per cent aniline, the viscosity index of the 70 per cent of refined oil is 54. When the percentage of benzol is increased to about 17 per cent the viscosity index of the refined oil is approximately the same as with no benzol, and with increasing percentages of benzol the extraction results become poorer than with aniline alone. If we express selectivity by degree of improvement in viscosity index, in the case just noted, we have made the following maximum change in the selectivity of the reagent by the addition of the optimum amount of benzol, viz:

$$\frac{54-21}{48.5-21} = \frac{33}{27.5} = 1.20$$

or a twenty per cent increase in the selectivity. In processes employing large amounts of comparatively costly reagents, such an increase in the selectivity of the reagent is of considerable moment.

Similarly, Figure II shows that when we are treating the stock to obtain a product of a predetermined viscosity index, the same optimum percentage of benzol admixed with the refining reagent enables us to obtain an increased yield of product over aniline alone, the degree of increase of yield mounting rapidly with treatment designed to give refined oil of higher viscosity index.

Figure III presents the same results in different form, showing that for each constant ratio of total mixed solvent to oil there is an increased yield at the same optimum point, namely at about 6 per cent of benzol in admixture with the aniline reagent.

The above results point out that aniline containing from one to fifteen per cent by volume of benzol is greatly superior to aniline alone, and that the mixed reagent of maximum selectivity is one containing about six per cent of benzol and ninety-four per cent of aniline.

It has been discovered also that an increase in the temperature of treatment leads in general to an increase in the selectivity of a given reagent mixture, permitting comparable results with less reagent at higher temperatures. Such an increase occurs with all of the reagent mixtures herein discussed, and does not alter their relations between themselves. Consequently the preferred reagent mixtures may be used at any temperature permitting their separation from the oil to form a two-phase system, and the exact temperature for use in a given instance may be adjusted solely with regard to the characteristics of the oil undergoing treatment.

It is also known that substitution of countercurrent extraction for batch extraction enables the same result to be obtained with a lesser relative amount of reagent. No great change is produced in this way upon the optimum ranges and maxima thereof presented in Figures I and II, but the results shown in Figure III are altered somewhat in these respects. The minimum amount of mixed reagent which may be used is of course that amount necessary to produce a two-phase system. The maximum amount of such reagent to be used will vary with the character of stock to be refined, nature and history of that stock, ease of separation, cost of reagent, etc., and is of course an economic limit, the exact location of which may be altered by such things as changes in cost of reagent, types of process equipment available, and the like.

We have found that the maximum (i. e. most efficient percentage) within the broad optimum range of percentages of benzol which should be admixed with aniline to obtain best results varies somewhat with the nature of the stock being treated. For raw stocks of low viscosity index, the maximum point is shifted in the direction of a lesser addition of benzol, so that with Mid Continent stocks, for instance, the best or most efficient percentage of benzol is from 2 to 3 per cent. In general, the maximum or most efficient percentage of benzol will vary from about 2% to about 10%, but it will be understood that the broad optimum range of percentages which we have discovered extends for a range of several per cent to either side of these most efficient percentages as illustrated by the curves in Figs. I, II, and III for instance, so that the true scope of our invention embraces or includes a range of from about 1% to about 15%.

In treating highly naphthenic petroleum lubricant stock we prefer to employ from 3 to 7 volumes of a reagent consisting of aniline containing approximately six per cent of benzol by volume, at temperatures of from 60 to 150 degrees F. The specific method of treatment may be any of the following:

I a. Agitate with reagent.
b. Separate oil and extract.
c. Free oil of reagent by distillation.
d. Recover reagent from extract.

II a. Agitate oil with successive portions of reagent.
b. Separating successive extracts.
c. Free oil of reagent by distillation.
d. Recover reagent from extract.

III a. Treat oil by countercurrent flow with reagent.
b. Free oil of reagent by distillation.
c. Recover reagent from extract.

What we believe to be novel and desire to secure by Letters Patent is set forth in the following claims.

We claim:

1. In a process of refining lubricant oil stock containing ingredients of low viscosity index, the steps which comprise intimately mixing with the oil a reagent consisting of aniline to which has been added not less than one and not more than fifteen per cent of benzol, and separating a substantial portion of said low viscosity-index ingredients from the oil as an extract.

2. In a process of refining lubricant oil stock containing ingredients of low viscosity index, the steps which comprise intimately mixing with the oil a reagent consisting of aniline to which has been added approximately six per cent of benzol, and separating a substantial portion of said low viscosity-index ingredients from the oil as an extract.

3. In a process of refining lubricant oil stock containing ingredients of low viscosity index, the steps which comprise intimately mixing with the oil from 3 to 7 volumes of a reagent consisting of aniline to which has been added not less than one and not more than fifteen per cent of benzol, and separating from the oil an extract comprising a substantial portion of the low viscosity-index ingredients.

4. In a process of refining lubricant oil stock containing ingredients of low viscosity index, the steps which comprise intimately mixing with the oil from 3 to 7 volumes of a reagent consisting of aniline to which has been added approximately six per cent of benzol, and separating a substantial portion of said low viscosity-index ingredients from the oil as an extract.

5. In a process of refining lubricant oil stock containing ingredients of low viscosity index, the steps which comprise intimately mixing with the oil from 3 to 7 volumes of a reagent consisting of aniline to which has been added approximately six per cent of benzol, at a temperature of from 60 to 150 degrees F., and separating a substantial portion of said low viscosity-index ingredients from the oil as an extract.

6. That method of increasing the yield of refined oil for treatment with a fixed ratio of solvent, of increasing viscosity index of refined oil for a fixed yield, and of increasing yield for a fixed viscosity index of refined oil when treating petroleum lubricant oil with aniline for the selective removal therefrom of ingredients of naphthenic character which comprises the following steps: Admixing with aniline not less than one per cent nor more than fifteen per cent of its volume of benzol, contacting the mixed solvent with oil to be refined, allowing the contact mixture to separate into phases, and removing and purifying the phase containing the refined oil.

BERTRAND W. STORY.
VLADIMIR A. KALICHEVSKY.